May 21, 1929. A. L. ADATTE ET AL 1,714,203
PHOTOGRAPHIC PRINTING APPARATUS
Filed Feb. 11, 1928  2 Sheets-Sheet 2

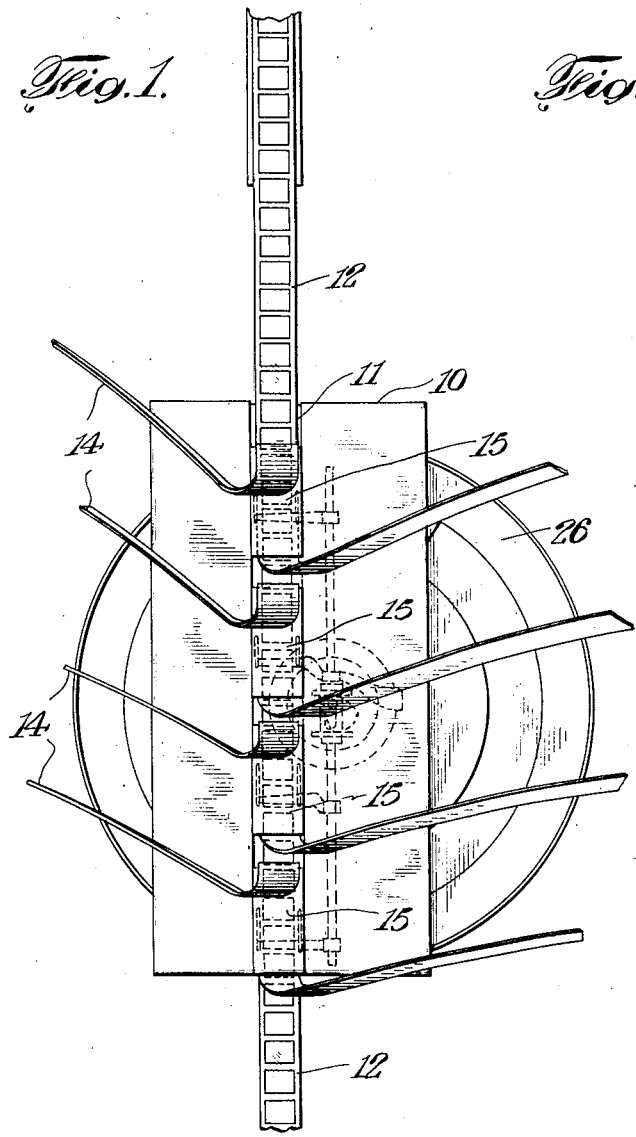
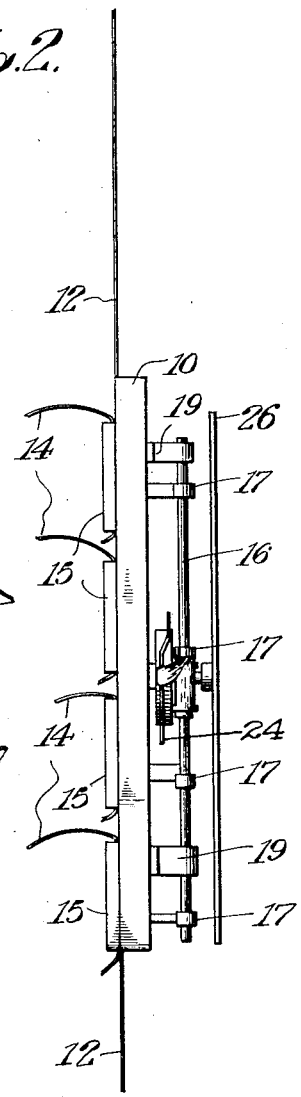

INVENTORS
Gaston L. Chanier
Albert L. Adatte
BY Hoguet and Neary
ATTORNEYS.

Patented May 21, 1929.

1,714,203

UNITED STATES PATENT OFFICE.

ALBERT L. ADATTE, OF NORTH PLAINFIELD, AND GASTON L. CHANIER, OF JERSEY CITY, NEW JERSEY, ASSIGNORS TO PATHE EXCHANGE, INC., OF BOUNDBROOK, NEW JERSEY, A CORPORATION OF NEW YORK.

PHOTOGRAPHIC-PRINTING APPARATUS.

Application filed February 11, 1928. Serial No. 253,705.

The present invention relates generally to improvements in machines for printing positive motion picture films from negative films. The invention is not, however, confined to photographic printing machines, but contains features which may also be applied to other apparatus.

The general object of the invention is to provide a machine of compact size for photographically printing a plurality of positive motion picture films from a negative film during a single passage of the negative film thru the machine.

One feature of the invention resides in a shutter for simultaneously covering or uncovering a plurality of light apertures.

Another feature of the invention is in the mechanism for feeding the negative and positive films past a plurality of light apertures at the same speed.

Other objects, features and advantages of the invention will appear as the description proceeds.

Reference is to be had to the accompanying drawings forming a part of this specification in which a preferred embodiment of the invention is disclosed and in which similar reference characters indicate similar parts thruout the several views:

Figure 1 is a front elevational view of an apparatus constructed in accordance with this invention;

Figure 2 is a side elevational view thereof;

Figure 3:
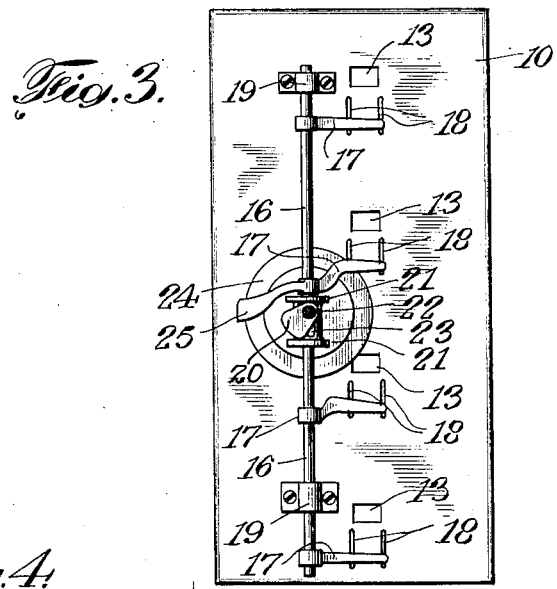
Figure 3 is a rear elevational view thereof.

Only those parts of the machine which are necessary for an understanding of the improved features characterizing the invention are shown in the drawings. The other parts of the machine may be of any desired or preferred forms, and, as they do not constitute any part of this invention, are omitted.

The invention is illustrated in application to a photographic printing machine which may comprise a plate 10 providing a guideway 11, preferably vertical and rectilinear, and thru which the negative film passes. The guideway has a plurality of spaced openings or light apertures 13 in front of which the negative film passes in travelling and being fed thru the machine. Positive films 14 are fed in juxtaposition with and in front of the negative between the negative and film gates 15, each positive film being fed with the negative past a corresponding light aperture.

In the drawings, we have shown the machine as adapted to print four positive films from a single negative and have consequently shown the machine as provided with four light apertures, but, of course, the number of positive films that may be printed as well as the number of light apertures used in the machine may vary and are entirely optional, and any number, two or more, may be used in the practice of the invention.

The positive films are fed in unison with the negative intermittently and at the same speed past the respective light apertures. The feeding means preferably comprise a plurality of film feeding elements bodily movable as a unit and adapted to feed the negative and positive films at the same speed thru the machine and past the light apertures. In the preferred form shown, the feeding mechanism comprises a rod 16 arranged at one side of the film guideway and preferably parallel thereto and positioned at the rear of the plate 10. This rod 16 carries a number of arms 17 rigidly, each arm corresponding to an aperture in the plate 10 and each having means such as claws to engage with the negative and with the corresponding positive, the engaging means to this end extending thru slots 18 or the like in the plate 10. The rod 16 is also journaled in bearings 19 carried by the plate 10 on the back thereof and is adapted for rotation or tilting in said bearings and also for axial reciprocating movement, so that the arms 17 may be reciprocated and also tilted on the rod 16 as an axis. The rod is reciprocated axially and also tilted at the ends of its strokes communicating similar movements to arms 17, to cause intermittent feeding and movement of film in the guideway.

The means for imparting axial reciprocations to the rod 16 comprises a radial cam 20 positioned between abutments 21 on rod 16 and carried on a continuously rotating shaft 22 extending horizontally in a perpendicular relation to rod 16 and thru a suitable slot 23 between abutments 21, said slot permitting vertical reciprocations of the rod 16 without interference by the shaft 22. The continuous rotation of the radial cam between the abutments imparts the axial reciprocations to the rod 16.

On the shaft 22 there is also positioned an axial or Lumière cam 24 having portions offset axially of the shaft 22. An arm 25 is associated with the rod 16 and its free end embraces the axial cam so that the axial cam, which also continuously rotates with the shaft 22, imparts an oscillating or tilting movement to the arm 25 and consequently a corresponding tilting movement to shaft 16 and arms 17.

The shaft 22 is preferably spaced unequally from the apertures and to one side of the guideway with rod, 16, and a shutter, 26, may be mounted on the shaft. In the embodiment shown, the shaft is between the adjacent central apertures at unequal distances therefrom.

Figure 4:
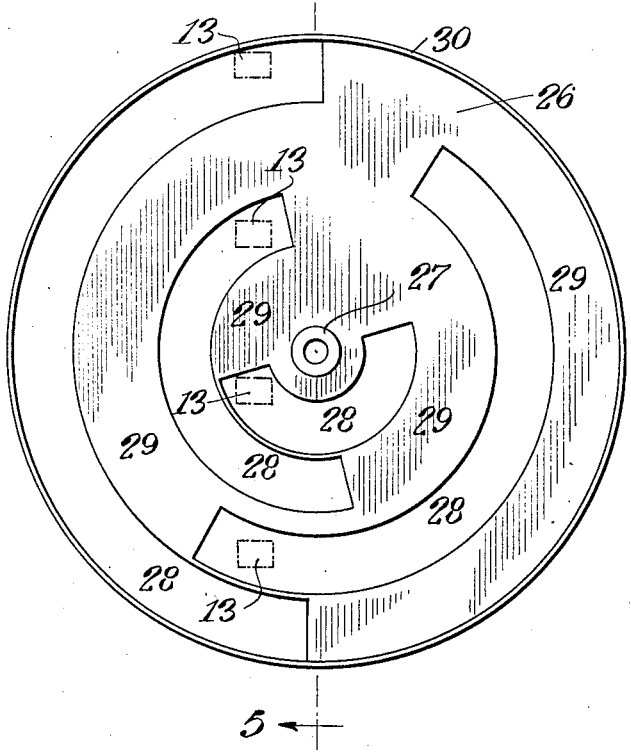
Figure 4 is an isolated elevational view of a shutter which may be employed.
Figure 5:
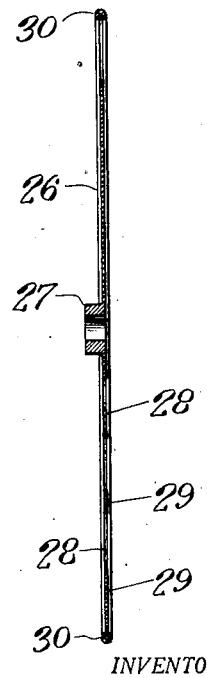
Figure 5 is a sectional view thru the shutter taken on the line 5—5 of Figure 4.

The shutter is adapted to simultaneously cover or uncover the light apertures 13 and is preferably constructed as shown in Figures 4 and 5. The shutter shown has a bearing 27 for disposition on the shaft 22 and a plurality of arcuate slots 28. These slots are concentric and of different radii and are also staggered circularly providing arcuate portions 29 in the shutter, which portions are also concentric, of different radii and staggered circularly. This construction is such as to provide for simultaneous covering or uncovering of the light apertures so as to expose the negative and positive films to light when they are stationary and at rest and to shut off the light while they are being moved from one intermittent position to the next. A rim 30 may be provided on the shutter, if desired, but is not necessary and may be omitted.

The provision of a single shutter as well as the feeding mechanism of unitary nature provides a printing machine which is adapted to print a plurality of positive films from a negative during a single passage of the negative thru the machine and further provides this machine with a compact construction and of convenient size. The machine is also characterized by the nicety of its construction and particularly the perfect synchronism between the shutter and the film feeding means.

Having thus described our invention, what we claim as new and desire to secure by Letters Patent is:

1. A photographic printing machine comprising means providing a film guideway for a negative film, said guideway having a plurality of spaced light apertures and being adapted to guide positive films past said apertures in juxtaposition with the negative film, means for intermittently feeding the negative and positive films past the apertures at the same speed, a rotary shutter positioned on an axis unequally spaced from the apertures, said rotary shutter having concentric arcuate slots of different radii forming arcuate portions in said shutter, said arcuate portions being adapted to cover said apertures during periods of movement of the films and uncover said apertures during periods of rest of the films.

2. A machine of the class described comprising means providing a film guideway, said guideway having a plurality of spaced light apertures and being adapted to guide film past said apertures, an arm at each aperture for causing feeding of film past the aperture, means for reciprocating said arms in unison, and means for tilting said arms at the ends of strokes.

3. A machine of the class described comprising means providing a film guideway, said guideway having a plurality of spaced light apertures and being adapted to guide film past said apertures, an arm at each aperture for causing feeding of film past the aperture, a rod arranged to one side of the guideway and carrying the arms rigidly, said rod being adapted for rotary and axial movement, means for axially reciprocating the rod, and means for tilting the rod at the ends of strokes.

4. A machine of the class described comprising means providing a film guideway, said guideway having a plurality of spaced light apertures and being adapted to guide film past said apertures, an arm at each aperture for causing feeding of film past the aperture, a rod arranged to one side of the guideway and carrying the arms rigidly, said rod being adapted for rotary and axial movement, a rotary shaft positioned substantially perpendicular to the rod and spaced unequally from the apertures, a radial cam on said shaft, means carried by the rod acted upon by the cam to axially reciprocate the rod, means for tilting the rod at the ends of strokes, and a rotary shutter on the shaft, said shutter having concentric arcuate slots of different radii forming arcuate portions in the shutter, said arcuate portions being adapted to cover said apertures during periods of movements of the film and uncover the apertures during periods of rest of the films.

5. A machine according to claim 4, in which the axis of the rotary shutter is on the side of the guideway with the rod and the arcuate slots in the shutter are staggered circularly.

6. A machine of the class described comprising means providing a film guideway having a plurality of light apertures, members acting at each aperture to intermittently feed film past the apertures, said members being bodily movable as a unit, means to impart reciprocations to said members parallel to the guideway, and means to move said members toward and away from the guideway at the ends of strokes of the members, all movements of said members occurring simultaneously and in unison.

In testimony whereof, we have signed our names to this specification this 8th day of February, 1928.

ALBERT L. ADATTE.
GASTON L. CHANIER.